United States Patent [19]

Garuglieri

[11] Patent Number: 5,325,900
[45] Date of Patent: Jul. 5, 1994

[54] FENCE

[75] Inventor: Andrea Garuglieri, Colle Brianza, Italy

[73] Assignee: Black & Decker Inc., Newark, Del.

[21] Appl. No.: 111,754

[22] Filed: Aug. 24, 1993

[51] Int. Cl.⁵ .............................................. B27C 1/12
[52] U.S. Cl. .......................... 144/253 J; 144/134 A; 144/253 R
[58] Field of Search ............... 409/218, 226; 269/126, 269/297, 317; 144/134 R, 134 A, 253 R, 253 J

[56] References Cited

U.S. PATENT DOCUMENTS

| | | | |
|---|---|---|---|
| 2,896,679 | 7/1959 | Shouten | 144/253 J |
| 4,304,276 | 12/1981 | Termini | 144/253 J |
| 4,768,571 | 9/1988 | Aigner | 144/253 J |
| 5,016,693 | 5/1991 | Haffely et al. | 144/253 J |

Primary Examiner—W. Donald Bray
Attorney, Agent, or Firm—Charles E. Yocum; Dennis A. Dearing; John D. Del Ponti

[57] ABSTRACT

A fence (50) for supporting a workpiece, having two frame members (52, 54) and each frame member (52, 54) having rows of longitudinal grooves (62) in which frame elements or slide bars (66) are retained. An opening (24) between the frame members (52, 54) is reduced to a narrow gap to allow passage of a blade and varied according to a desired cutting angle by moving the slide bars (66) along the grooves (62). Movement of the slide bars (66) is achieved by rotation of a roller (75) mounted in a vertical bore in its respective frame member. The roller abuts the rear of the slide bars (66) and thus also prevents unwanted movement of the slide bars when stationary.

6 Claims, 2 Drawing Sheets

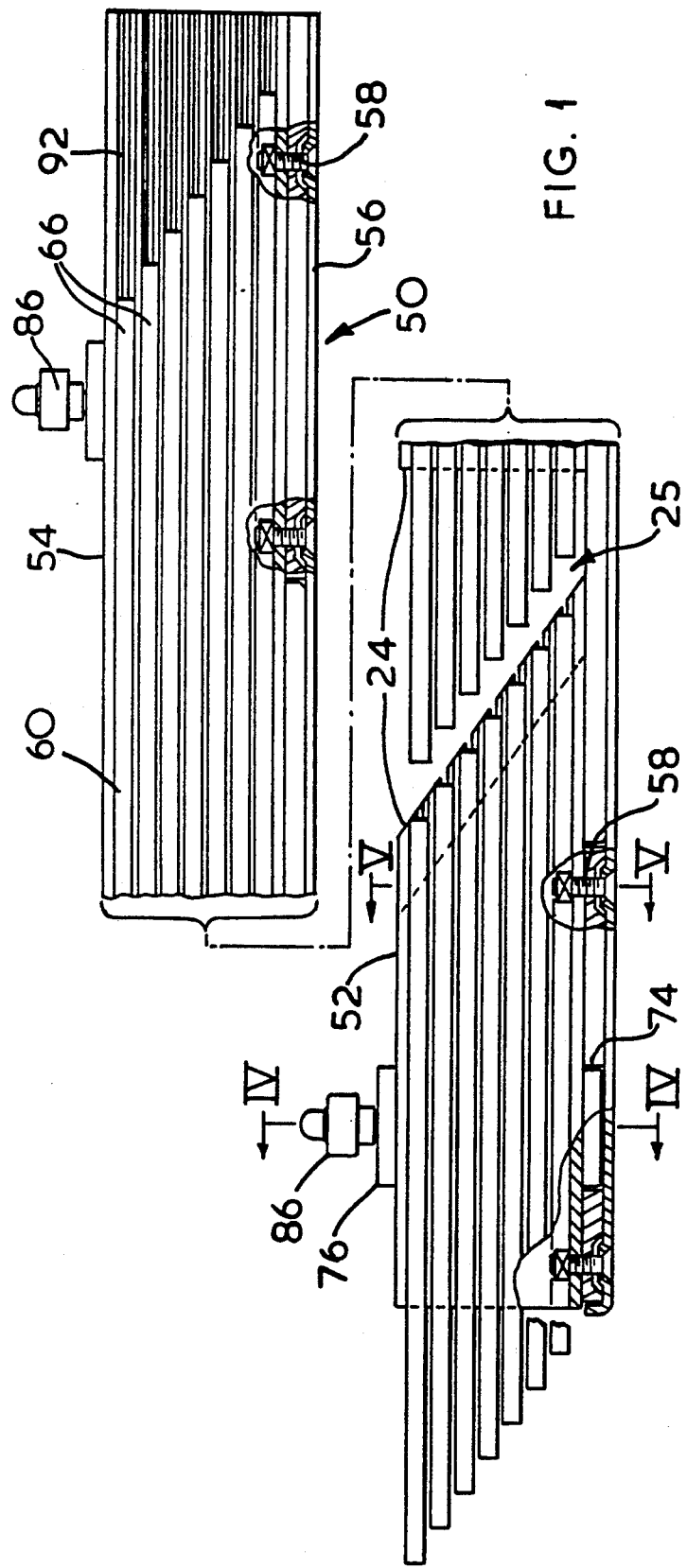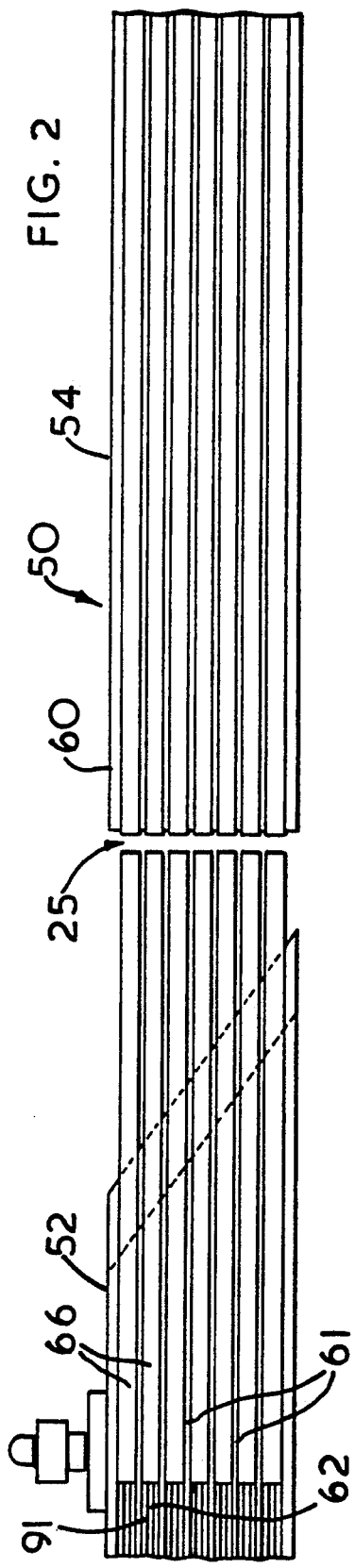

FIG. 3
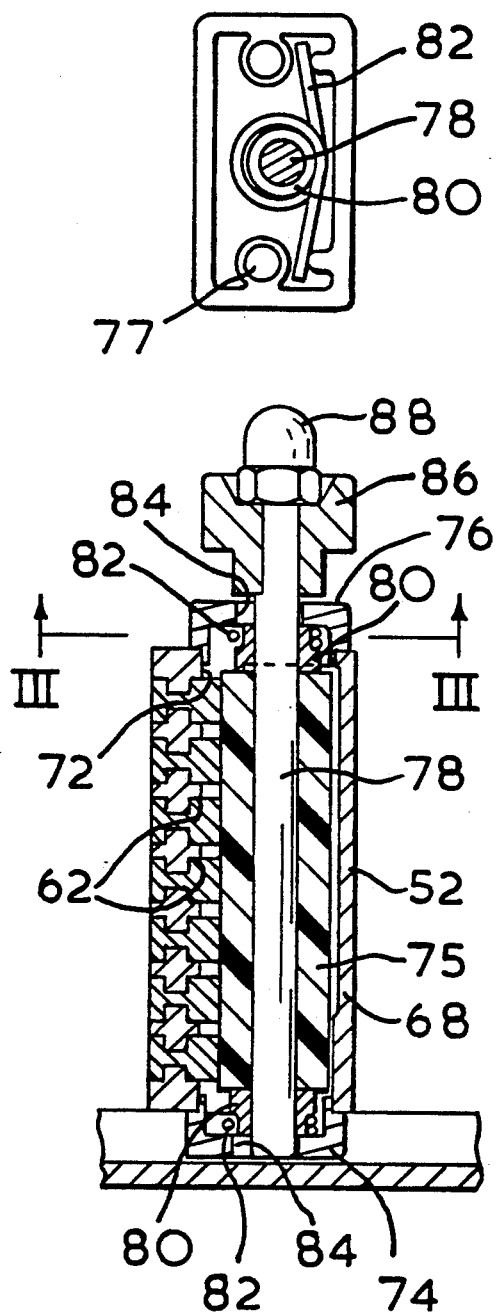
FIG. 4
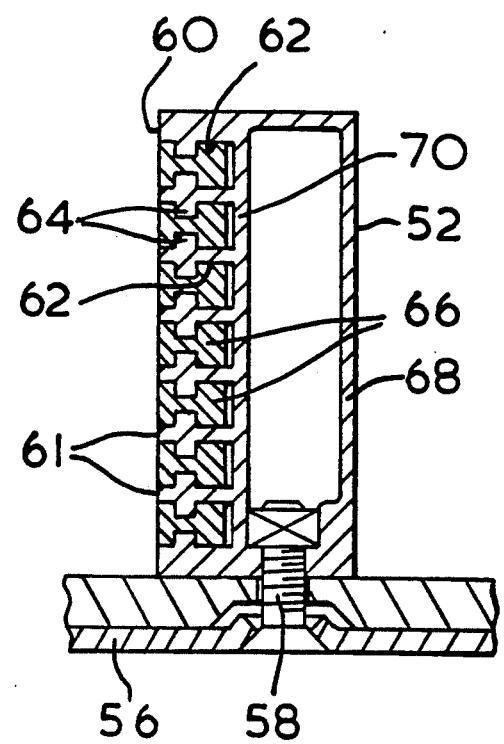
FIG. 5

FENCE

BACKGROUND OF THE INVENTION

This invention relates to a guide fence for a cutting tool. In particular, it relates to an end fence which supports a workpiece whilst allowing different cuts to be made in or through the workpiece.

Typically, a fence is used with a saw blade assembly and table, with the workpiece being supported on the table and against the fence. The saw blade assembly is adapted to make both mitre and bevel cuts. In order to allow for this range of cuts to be made, the fence is provided with an opening to allow passage of the blade as a cut is completed. Whilst the opening is essential to enable completion of the cut, it unfortunately removes support at the rear edge of the workpiece, thus allowing splintering of the workpiece to occur.

In an attempt to alleviate this problem, it has been known to provide a plastic insert around the opening to support the workpiece and which the blade can enter without causing damage to the blade. After successive cuts have been made, however, the insert is gradually destroyed and needs to be replaced.

U.S. Pat. No. 5,016,693 discloses a guide fence for a spindle moulder comprising a plurality of stacked members, wherein the members are independently moveable to adjust the size and shape of the gap between them to accommodate variously sized and shaped cutting mechanisms.

However the members provide the workpiece support, and hence accuracy is potentially a problem with these moveable elements. Secondly, it is difficult to position the moveable elements.

SUMMARY OF THE INVENTION

It is therefore an object of the present invention to provide a fence which provides support for the workpiece so as to avoid splintering etc. and which is not itself destroyed by the cutting operation and which does not suffer from the problems mentioned above, or which at least mitigates their effects.

According to the present invention, there is provided a fence for supporting a workpiece and comprising two frame members separated by an opening, each frame member having longitudinal grooves defined therein with frame elements within the grooves, and means for moving the frame elements along their respective grooves whereby the opening can be reduced to a narrow gap to allow passage of a blade at any desired cutting angle.

Preferably, the grooves include inwardly directed flanges and the frame elements include complementary slots for receiving the flanges. This arrangement allows better engagement of the frame elements within the grooves. Alternatively, the frame elements may include outwardly projecting flanges which engage with complementary slots within the grooves, although it is preferred that reduction in material be made in the frame elements rather than in the frame members themselves which would weaken the structure of the frame members.

Usually, each frame member further includes an upwardly extending bore which exposes the grooves and any elongate members within the exposed grooves. The means for moving the frame elements may comprise a roller mounted within this bore and abutting exposed frame elements. Rotation of the roller thus causes the frame elements to slide along the grooves, the direction of rotation dictating the direction of the sliding action.

Preferably, the fence further includes means for biasing the roller against exposed frame elements so as to improve contact between the roller and frame elements. The fence may include means for preventing undesired movement of the frame elements along the grooves. Usually this braking action will be provided by the biasing of the roller against the frame elements which prevents the frame elements from sliding along the grooves under the influence of vibration or gravity, should the fence become tilted.

Typically, one side of the opening, formed by an end of one of the frame members, is inclined from the vertical. The other side of the opening will usually be substantially vertical. In the case of a bevel cut, for example, the inclined end of the frame member may thus provide one side of the narrow gap, the other side of the narrow gap being formed by sliding frame elements along their respective grooves until a desired width of gap is achieved.

BRIEF DESCRIPTION OF THE DRAWINGS

A preferred embodiment of fence will now be described by way of example only, with reference to the drawings, in which:

FIG. 1 is a broken front view of a fence arranged for a bevel cut;

FIG. 2 is a front view of the fence of FIG. 1 arranged for a vertical cut;

FIG. 3 is a section on the line III—III in FIG. 4;

FIG. 4 is a section along the line IV—IV in FIG. 1; and

FIG. 5 is a section along the line V—V in FIG. 1.

DETAILED DESCRIPTION OF A PREFERRED EMBODIMENT

The fence 50 illustrated in FIGS. 1 to 5 comprises two frame members or frames 52, 54 secured to a work table 56 by set screws 58. Each frame 52, 54 is constructed from extruded aluminium, and the front face 60 thereof has rows of horizontally aligned longitudinal grooves 62. Each groove 62 has two inwardly directed flanges 64 which retain appropriately profiled frame elements 66 which slide into the grooves 62 from one end of each frame 52, 54.

Each frame 52, 54 is hollow in section having side walls 68, 70. The side wall 70 also forms the base of each groove 62.

At one central location along each frame 52, 54 there is a vertically arranged, circular bore 72 cut into the material of each frame. The bore 72 is so arranged and dimensioned that the wall 70 is removed over an arc of the bore 72 exposing the base of each groove 62. Above and below, the bore 72 is closed by an end cap 74, 76 retained on the frames 52, 54 by screws passing through holes 77 formed in the end caps 74, 76. Before the end caps are positioned over, and located in, the bore 72, a rubber like roller 75 rotationally fixed on a shaft 78 is inserted in the bore 72. A collar 80 on the shaft 78 at either end of the roller 75 receives a spring 82. When the end caps 74, 76 are positioned over the ends of the shaft 78 (a central aperture 84 in each cap being provided for this purpose) the springs 82 are arranged resiliently to bias the roller 75 towards the open back ends of the grooves 62. The shaft 78 has at its top end a thumb screw 86 fixed thereon by a nut 88.

The roller 75 is therefore arranged to abut against the back of the frame elements or slide bars 66 arranged in the grooves 62. Thus rotation of the thumb screw 86 rotates the roller 75 causing the slide bars 66 to slide along the grooves 62. The roller 75 also serves as a brake on the slide bars 66 preventing them from sliding along the groove 62 under the influence of vibration or gravity, should the table 56 or fence be tilted for any reason.

The frame elements 52, 54 between them define an opening 24 to receive the blade of the saw. The left hand frame 52 is inclined at its end forming one side of the opening 24 to allow for bevel cuts. The end of the frame 54 is substantially vertical although it could likewise be inclined.

To use the fence 50, the angle at which the blade is to cut a work piece is first set before a work piece is positioned on the work table 56. The blade in its set angle is positioned in the opening 24. The thumb screw 86 on each frame 52, 54 is then rotated to move the slide bars 66 into the opening 24. When each slide bar abuts the blade in the opening, it is prevented from moving further and so the roller 75 simply slides over it. The thumb screw 86 is further rotated however until all the slide bars 66 abut the blade and none can move any further. At this point, the thumb screw 86 is rotated back slightly to release all the slide bars 66 from the blade. The same procedure is followed on both frames 52, 54 resulting in a narrow gap or slot 25 into which the blade can pass after cutting the work piece. The slide bars 66 on either side of the slot 25 support the work piece and effectively prevent excessive splintering.

The slot 25 can be positioned at any desired angle within the range of the mitring and bevelling capabilities of the saw. Should a user of the saw inadvertently adjust the blade angle without adjusting the bars 66, then this will result in the bars 66 being cut by the blade. This is obviously not recommended, but the bars 66 are of relatively soft aluminium section and will not offer a great deal of resistance to the blade. If the bars 66 are cut, this will merely result in them being shortened slightly, but will not prevent them continuing to serve their above described function.

In regions 91 and 92 of the frames 52, 54 respectively, the front edges 61 of the grooves 62 provide quite adequate support for the work piece, whether or not the slide bars 66 extend between them. The front surface of the slide bars 66 and the edges 61 are flush with the end face 60 of each frame 52, 54, so that support is provided either by the slide bars alone, by the frame member alone, or by the frame member with slide bars within its grooves.

It will be appreciated that the invention has been described above by way of example only and that changes may be made without departing from the scope of the invention.

I claim:

1. A fence for supporting a workpiece while it is cut with a cutting element, comprising:
   a work table;
   two frame members attached to said work table in a longitudinally spaced-apart relationship defining an opening between said frame members, each of said frame members having longitudinal grooves defined therein;
   frame elements movably engaged in said longitudinal grooves; and
   moving means for moving said frame elements longitudinally in said grooves, whereby said opening can be adjusted to conform with the size and position of said cutting element.

2. The fence of claim 1, further comprising:
   flanges provided on said frame members and extending inwardly into said grooves; and slots provided on said frame elements for receiving said flanges.

3. The fence of claim 1 wherein said moving means comprises a roller mounted within an upwardly extending bore in said frame members and abutting said frame elements.

4. The fence of claim 3 further comprising biasing means to bias said roller against said frame elements.

5. The fence of claim 1 further comprising holding means for preventing undesired movement of the frame elements along the grooves.

6. The fence of claim 1 wherein an end of one of said frame members adjacent to said opening is inclined from the vertical.

* * * * *